(12) United States Patent  (10) Patent No.: US 8,904,959 B2
Lush  (45) Date of Patent: Dec. 9, 2014

(54) HAVEN FOR USE WITH A BIRD FEEDER (71) Applicant: Woodstream Corporation, Lititz, PA (US)

(72) Inventor: Raymon W. Lush, Bloomfield, NE (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 13/896,886

(22) Filed: May 17, 2013

(65) Prior Publication Data
US 2013/0305993 A1 Nov. 21, 2013

Related U.S. Application Data
(60) Provisional application No. 61/648,358, filed on May 17, 2012.

(51) Int. Cl.
A01K 5/00 (2006.01)
(52) U.S. Cl.
USPC ...................................... 119/51.01; 119/57.9
(58) Field of Classification Search
USPC .......... 119/51.01, 57.8, 57.9, 52.2, 52.3, 469, 119/461, 462; D30/160, 124
See application file for complete search history.

(56) References Cited

U.S. PATENT DOCUMENTS

| D115,427 S * | 6/1939 | Schepps ...................... D30/115 |
| 2,464,665 A * | 3/1949 | Anderson ...................... 446/227 |
| 2,614,838 A * | 10/1952 | Taylor ............................ 472/71 |
| 2,799,244 A * | 7/1957 | Dorsey .......................... 119/461 |
| D181,358 S * | 11/1957 | Johnson ........................ D11/121 |
| 2,845,895 A * | 8/1958 | Balkauskas .................... 119/461 |
| D234,790 S * | 4/1975 | Rosenberg .................... D30/160 |
| 5,203,281 A * | 4/1993 | Harwich ....................... 119/57.9 |
| 5,336,536 A * | 8/1994 | Oberzan .......................... 428/8 |
| D371,087 S * | 6/1996 | Jacobson ..................... D11/121 |
| 6,047,661 A | 4/2000 | Lush |
| 6,073,582 A | 6/2000 | Lush |
| 6,213,054 B1 * | 4/2001 | Marshall ...................... 119/57.8 |
| 6,505,438 B1 * | 1/2003 | Hsia .............................. 47/24.1 |
| 6,758,164 B2 * | 7/2004 | Rich ............................ 119/52.3 |
| D498,701 S * | 11/2004 | Libuda et al. ................ D11/125 |
| 6,973,896 B2 * | 12/2005 | Smith ........................... 119/61.1 |
| 7,032,538 B1 * | 4/2006 | Lush ............................ 119/52.1 |
| 7,089,878 B2 * | 8/2006 | Huang ........................ 116/63 C |
| 7,185,605 B1 * | 3/2007 | Lush ............................ 119/52.2 |
| 7,258,075 B1 * | 8/2007 | Jones et al. .................. 119/57.9 |

(Continued)

FOREIGN PATENT DOCUMENTS

GB 410220 5/1934
GB 2485839 5/2012

Primary Examiner — Yvonne Abbott
(74) Attorney, Agent, or Firm — Jacobson Holman Hershkovitz, PLLC.

(57) ABSTRACT

A haven for use with a bird feeder is provided that includes a collapsible spiral rod assembly having an upper end and a lower end. The spiral rod haven has a plurality of spiral convolutions and is selectively movable between a collapsed position and an extended position. The spiral rod haven defines an interior compartment when in its extended position. A bird feeder is positioned within the interior of the compartment. The bird feeder may be either a collapsible bird feeder, a tube-type bird feeder or any other type of bird feeder that may be positioned within the interior compartment of the haven. Small birds may gain access to the bird feeder by moving through adjacent convolutions while the convolutions prevent large birds or squirrels from entering the interior of the haven.

19 Claims, 10 Drawing Sheets

(56) References Cited

U.S. PATENT DOCUMENTS

| | | |
|---|---|---|
| 7,302,911 B1 | 12/2007 | Lush |
| 7,503,282 B1 * | 3/2009 | Lush ............................ 119/52.2 |
| 7,506,611 B1 * | 3/2009 | Lush ............................ 119/52.1 |
| 7,992,520 B2 | 8/2011 | Lush |
| D662,853 S * | 7/2012 | Akbik ........................... D11/121 |
| D676,615 S * | 2/2013 | Van Dyk ....................... D30/127 |
| D678,813 S * | 3/2013 | Akbik ........................... D11/121 |
| D681,884 S * | 5/2013 | Kingdon ....................... D30/127 |
| 2005/0145182 A1 | 7/2005 | Marshall |
| 2011/0174233 A1 | 7/2011 | Lush |

\* cited by examiner

FIG. 10
(cut-away view)

HAVEN FOR USE WITH A BIRD FEEDER

This application is based on U.S. provisional application Ser. No. 61/648,358 filed May 17, 2012, and hereby claims the priority thereof to which it is entitled.

BACKGROUND OF THE INVENTION

1. Field of the Invention

The present invention relates to a collapsible haven for use with a bird feeder which prevents squirrels from gaining access to the feed meant for birds and for preventing large birds such as blackbirds and grackles from consuming bird feed meant for smaller birds.

2. Description of the Related Art

Many attempts have been made to provide squirrel-proof bird feeders. Many attempts have also been made to prevent large birds such as blackbirds and grackles from consuming bird feed intended for small birds. For example, Applicant's U.S. Pat. No. 7,992,520 ("the '520 patent") discloses a feeder having an outer housing that encloses an inner housing and prevents squirrels from accessing the inner housing. The disclosure of the '520 patent is hereby expressly incorporated by reference as if fully set forth herein. The outer housing of the feeder disclosed in the '520 patent is effective in preventing squirrels and large birds from accessing seed in the bird feeder, but increases the size of feeder both in use and when stored.

To facilitate storage of bird feeders, many collapsible bird feeders have been developed such as that disclosed in Applicant's U.S. Pat. No. 6,073,582 ("the '582 patent") and U.S. Pat. No. 6,047,661 ("the '661 patent"). The disclosures of the '582 patent and the '661 patent are hereby expressly incorporated by reference as if fully set forth herein. The feeders set forth in the '582 patent and the '661 patent do not, however, provide a means for deterring squirrels.

Therefore, a need exists for a feeder assembly that is resistant to access by squirrels and large birds and which can also be collapsed for compact storage.

SUMMARY OF THE INVENTION

In view of the foregoing, the present invention is directed to a haven designed for use with bird feeders that fall within a specified range of overall heights and diameters. The haven includes a collapsible spiral rod with a plurality of spiral convolutions and having an upper end and a lower end. The spiral rod haven is selectively movable between a collapsed position and an extended position. When in its extended position, the spiral rod haven defines an interior or interior compartment within which a bird feeder having a height and diameter falling within the specified range may be received.

The present invention is also directed to a bird feeder assembly having a haven that makes the feeder resistant to the access of squirrels and large birds. The assembly includes a collapsible spiral rod haven having an upper end and a lower end. The spiral rod haven has a plurality of spiral convolutions and is selectively movable between a collapsed position and an extended position.

When in its extended position, the spiral rod haven defines an interior or interior compartment. The bird feeder of the assembly is positioned within the interior compartment of the spiral rod haven to complete the assembly. In addition, once the bird feeder is in place, a holding structure may be provided that locks the spacing between at least two adjacent convolutions. Locking the spacing of the convolutions of the spiral rod when the haven is in its extended position prevents the convolutions from being further separated or pulled away from one another, such as by the efforts of a squirrel, and thereby preventing a squirrel from gaining access to the bird feeder within the haven.

Preferably, the lower end of the spiral rod haven has a selectively closable opening formed therein to enable a non-collapsible bird feeder, such as a tube-type bird feeder, to be inserted upwardly through the haven lower end and into the interior compartment of the spiral rod haven.

In a first embodiment, the bird feeder positioned within the interior compartment of the haven is also collapsible and is selectively movable between a collapsed position and an extended position so that the haven and bird feeder assembly may be collapsed as a unit. The collapsible bird feeder may be inserted through the closable opening in the bottom of the haven or, with the bird feeder in the collapsed position, the bird feeder may inserted through the side of the haven between two adjacent convolutions that are pulled apart from one another by the user during assembly of the bird feeder into the haven interior.

In a second embodiment, the spiral rod haven is used with a non-collapsible tube-type bird feeder which is inserted upwardly into the haven through the selectively closable opening formed in the lower end of the haven.

It is therefore an object of the present invention to provide a protective haven for use with a bird feeder that surrounds and prevents unwanted access to the bird feeder.

Another object of the present invention is to provide a haven in accordance with the preceding object that includes a spiral rod having upper and lower ends and which is movable between collapsed and extended positions.

Yet another object of the present invention is to provide a haven in accordance with the preceding objects in which the haven includes a selectively closable opening in the lower end thereof through which a bird feeder, in particular a non-collapsible bird feeder, may be inserted for placement within the haven.

A further object of the present invention is to provide a haven in accordance with the preceding objects that includes at least one securing component that locks the spacing of at least two adjacent convolutions to prevent the spacing between the convolutions from being increased by the efforts of a squirrel attempting to enter the haven.

A still further object of the present invention is to provide an assembly including a bird feeder and an outer haven that encloses the bird feeder which prevents large birds such as blackbirds and grackles, as well as squirrels, from entering the interior of the haven to gain access to the feed in a bird feeder positioned therein.

Yet a still further object of the present invention is to provide a haven for use with a bird feeder and an assembly including a haven and a bird feeder, both of which are aesthetically pleasing.

Another object of the present invention is to provide a haven for use with a bird feeder, as well as an assembly including a bird feeder and a haven, that are not complex in structure and which can be manufactured at low cost and efficiently constructed while also being durable in use and refined in appearance.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

While different embodiments of the invention are disclosed herein, it is to be understood that these embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
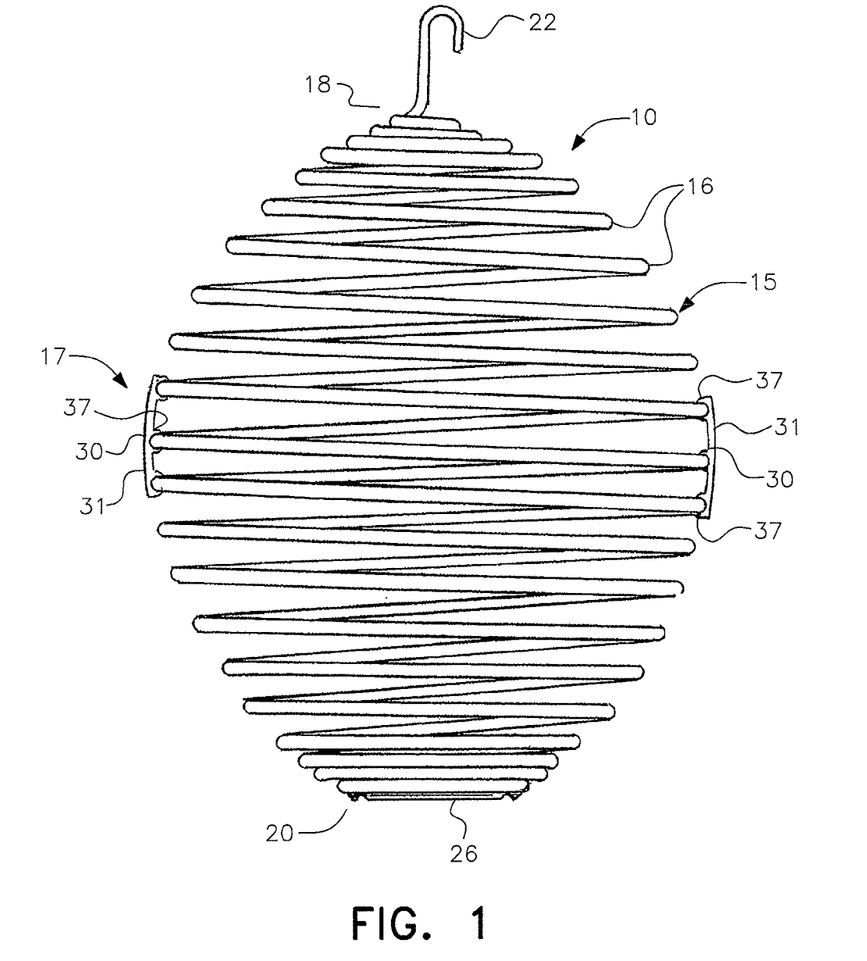
FIG. 1 is a side view of a first embodiment of a haven in accordance with the present invention, shown in an extended position and having spaced openings around its periphery.
Figure 2:
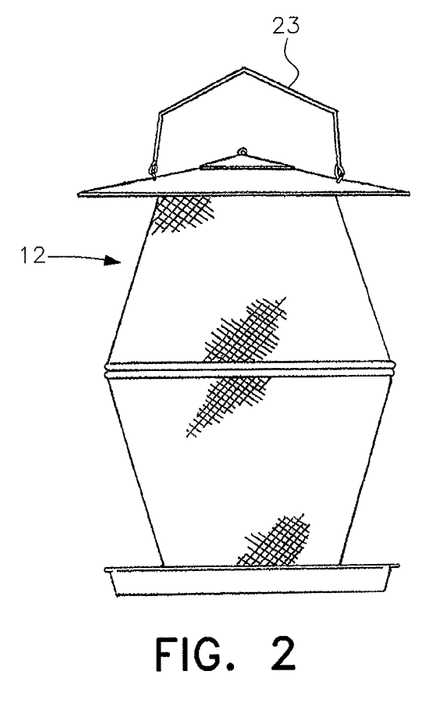
FIG. 2 is a side view of a collapsible bird feeder, shown in the extended position, which may be positioned in the interior of the haven shown in FIG. 1.

As shown in FIG. 1, the present invention is directed to a collapsible haven generally designated by reference numeral 10. The haven is intended to be used in conjunction with a bird feeder like, for example, the feeder shown in FIG. 2 and generally designated by reference numeral 12. The feeder 12 shown in FIG. 2 is also collapsible and may be configured in accordance with the feeders disclosed in the '661 patent and the '582 patent, previously incorporated herein by reference.

Figure 6:
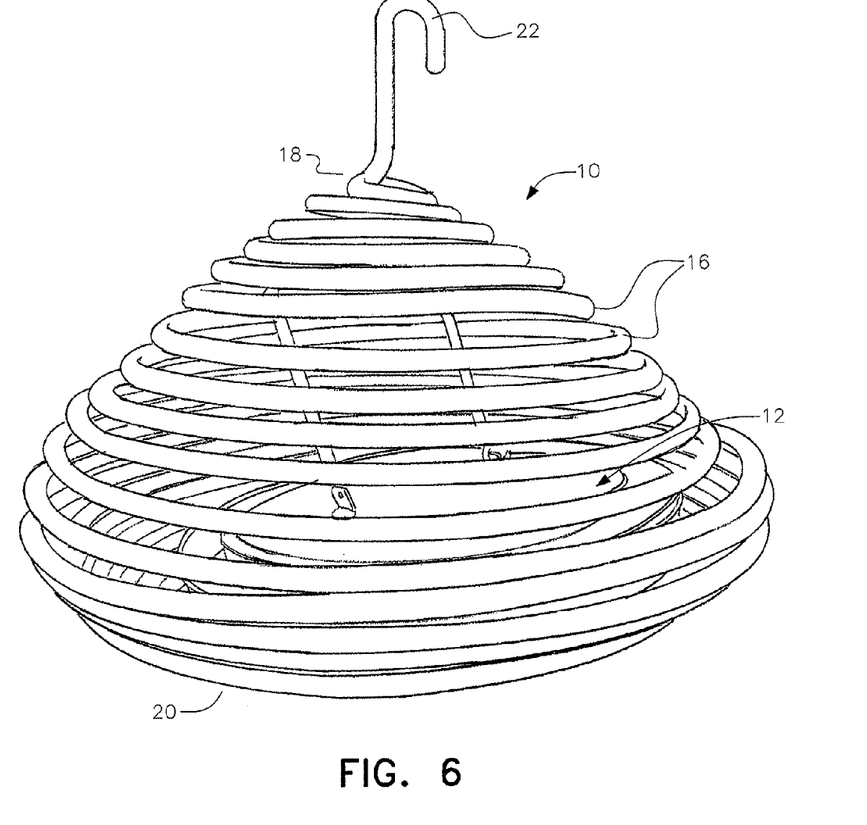
FIG. 6 is a side perspective view illustrating the assembly shown in FIGS. 4 and 5, with the haven and the bird feeder at least partly.
Figure 7:
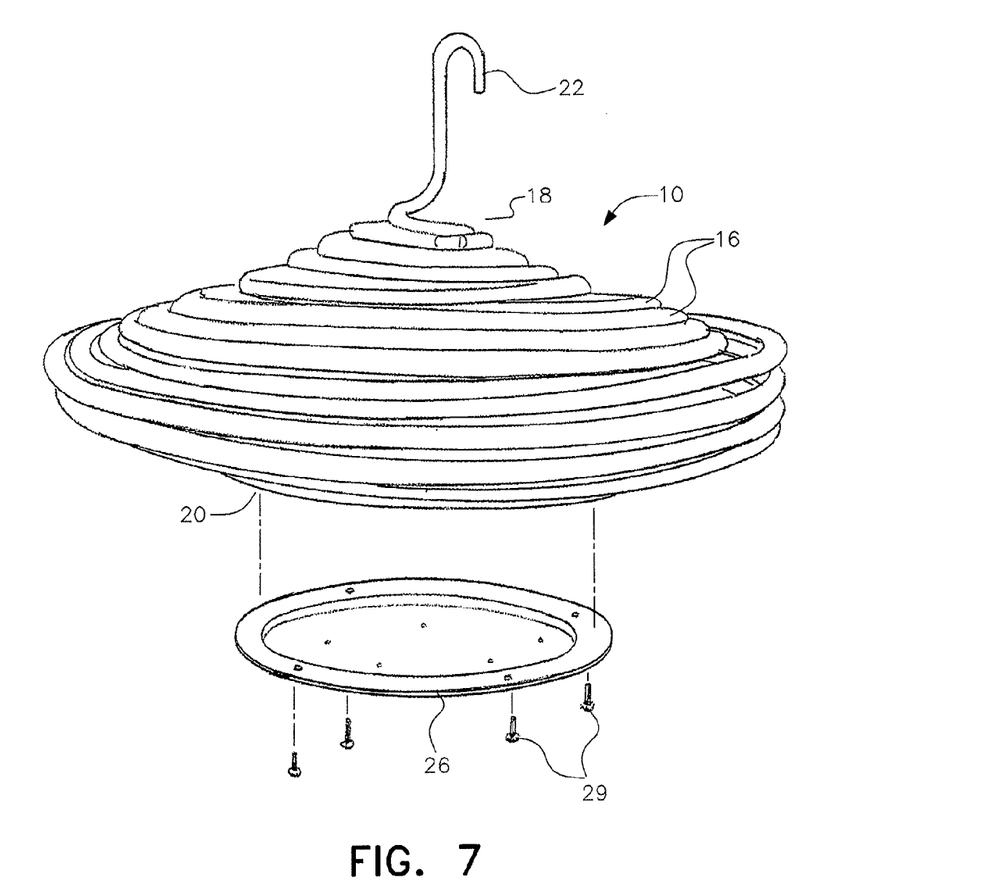
FIG. 7 is an exploded perspective view of the haven shown in FIG. 1, illustrating the haven in a at least partly collapsed position and the cover at the lower end thereof being separated therefrom.

The haven 10 includes a spiral metal rod generally designated by reference numeral 15 which is wound so as to provide a plurality of convolutions 16. The spiral rod haven 10 is movable between a collapsed position as seen in FIGS. 6 and 7, and an extended position as shown in FIG. 1.

The haven 10 includes an upper end 18, a lower end 20 and a middle portion, generally designated by reference numeral 17. The upper end 18 of the haven 10 includes a hook 22 to enable the haven 10 to be hung from a tree branch or other supporting structure (not shown).

Convolutions extending upwardly from the middle portion have a progressively reduced diameter. Similarly, convolutions extending downwardly from the middle portion have a progressively reduced diameter. As a result, the middle portion has a greater diameter than the respective diameters of the spiral convolutions 16 at the upper end 18 and at the lower end 20 of the haven 10, creating a generally pine-cone shaped haven. According to one configuration, and starting at the transition from the hook 22, the convolutions spread rapidly to a nominal 5 inch outer diameter, increasing to maximum of approximately 17 inches inner diameter at the midpoint and, from there downward, decreasing in diameter to approximately 6 inches outer diameter at the transition to the bottom closure feature such as cover 26. These dimensions are representative and the invention is not intended to be limited thereto as would be understood by persons of ordinary skill in the art.

Other shapes of the spiral rod could also be adopted. For example, the spiral rod could be configured so that the haven, when in the extended position, is generally cylindrical, cone-shaped, truncated cone-shaped, hourglass shaped, etc. With such alternate configurations, the degree to which the height of the haven can be reduced may be limited as each convolution may rest on top of (or inside) the convolution below it. The pine cone shaped configuration is preferred, therefore, since this shape provides for the lowest profile when the haven is in the collapsed position, which is desirable for shipment and storage.

The spiral rod is preferably made of metal, such as higher carbon CRS tempered tubing. Hard plastic could be used but is generally less durable and would likely be more susceptible to damage caused by squirrels in their efforts to gain access to the bird feeder inside the haven.

The rod preferably has a diameter of between about 7 mm and about 8 mm, and a wall thickness of about 1 mm +/−. It is preferred that the diameter of the rod remain constant between the hook 22 and the base closure feature. The cross section of the rod is substantially circular in the embodiment shown, but rods having other cross-sectional and/or profile shapes could also be used to form the convolutions. Whatever the shape of their cross-section or profile, spacing between the convolutions is maintained at a predetermined distance when the haven is in its expanded position so as not to permit passage of a squirrel's head. Optimal convolution spacing enables finch-sized birds to access the interior of the haven, and therefore may be on the order of about 0.25 inches to about 1.0 inch.

Figure 9:
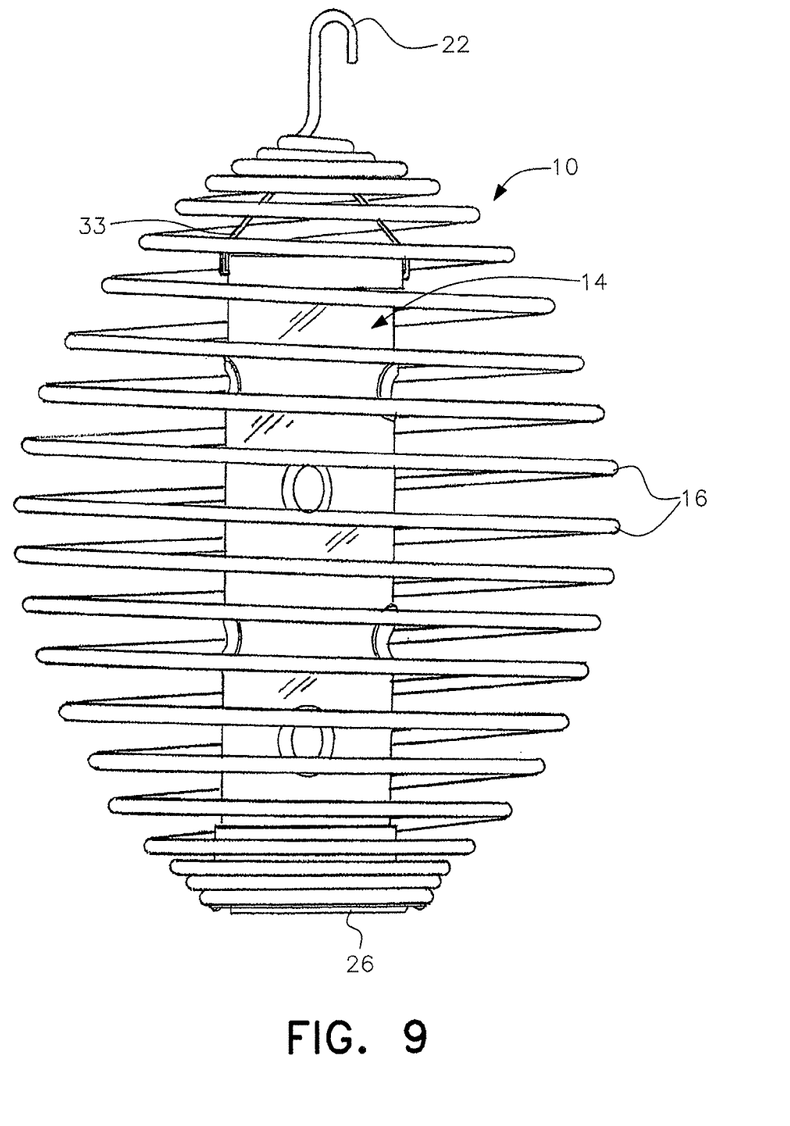
FIG. 9 is a side view of the haven and tube feeder shown in FIG. 8, now in the assembled position with the haven in the extended position.

The haven of the present invention thus protects a seed presentation area in the interior thereof. The seed presentation area is generally defined by a bird feeder that is positioned within the interior, the bird feeder having one or more feed ports that are in immediate proximity to the convolutions of the haven. In this regard, the spacing between the convolutions may be closer to the 1.0 inch range as the distance between the convolutions and the seed presentation area increases. For example, when using a tube feeder as shown in FIG. 9, the distance between the feed ports of the feeder and the inner diameter of the convolutions in the middle portion of the haven is significantly larger than the distance between the seed presentation area of the feeder shown in FIG. 4 and the inner diameter of the convolutions in the middle portion of the haven. Given such increased distance in the FIG. 9 configuration, the spacing can be somewhat larger since even partial entry of a squirrel's head would still not enable the animal to reach the seed presentation area.

In the embodiments shown, a single continuous rod is used. However, the rod could be composed of multiple pieces coupled together. The multiple pieces may be of the same or different materials provided they can be readily coupled to one another to create the appearance and function of the haven as described herein.

To ensure that a squirrel will not be able to physically cause a pair of the convolutions 16 to be forced away from one another sufficiently to enable the squirrel to enter the interior of the haven, the haven 10 is preferably provided with a plurality of connecting elements such as straps 30. The connecting elements or straps 30 are snapped onto two or more of the convolutions 16 after the haven has been placed in the extended position. The connecting elements or straps 30 lock at least two adjacent convolutions at a fixed spacing to prevent any enlargement of the spacing which could allow unwanted squirrel entry into the interior of the haven. The straps are removable and reattachable in order to collapse the haven and then hold the haven in an extended position, respectively.

Alternatively, the straps may be made of a flexible material that allows the straps to bend but which resists longitudinal stretching thereof. With such a flexible material, the straps could be permanently attached to the convolutions, the straps bending upon themselves when the haven is collapsed and yet resisting elongation when the haven is placed in the extended position.

Figure 4:
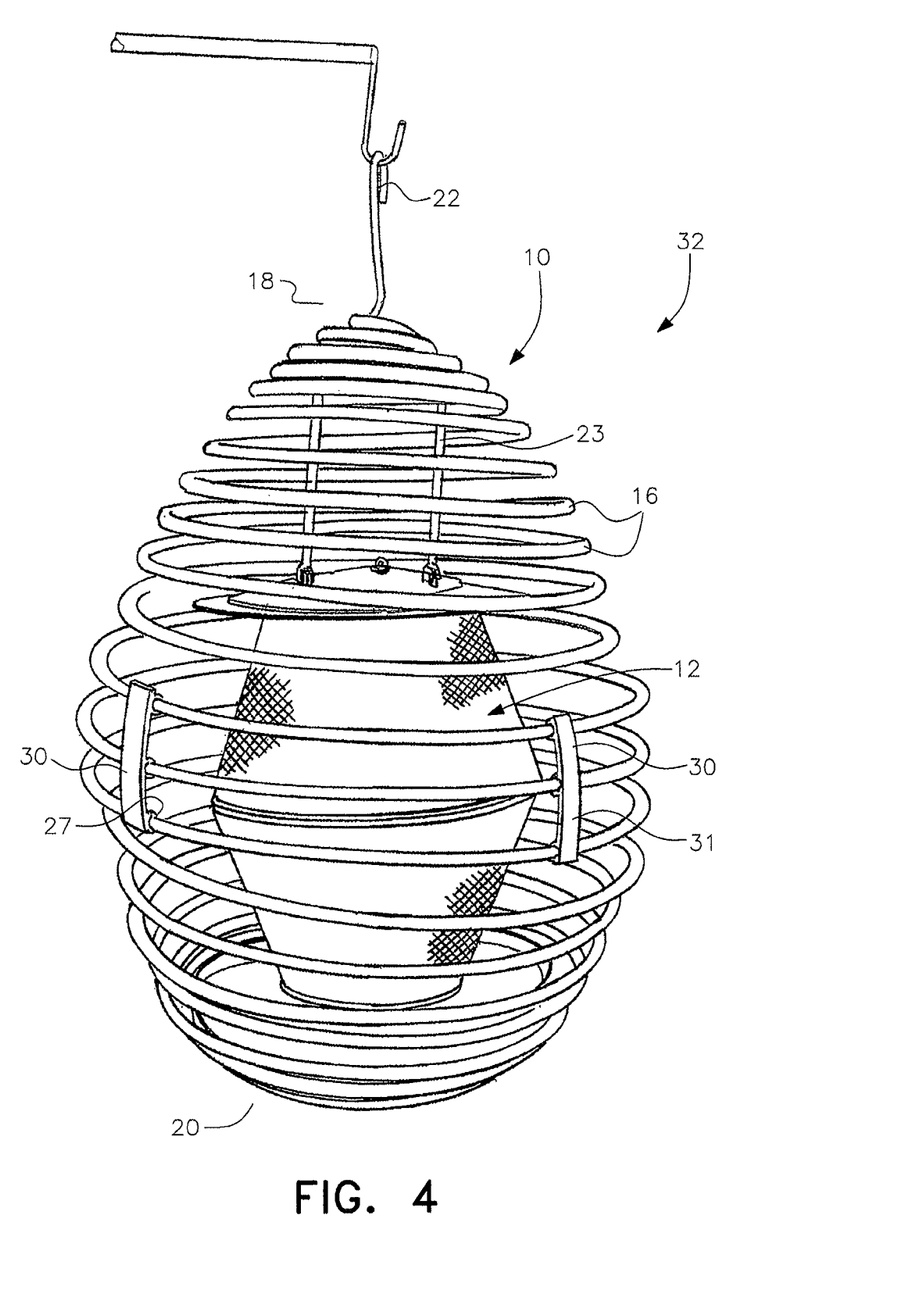
FIG. 4 is a side perspective view illustrating an assembly in accordance with the present invention in which the haven and collapsible bird feeder of FIGS. 1 and 2 are assembled so that the bird feeder is positioned in the interior of the haven with the haven and the bird feeder being in an extended position.
Figure 5:
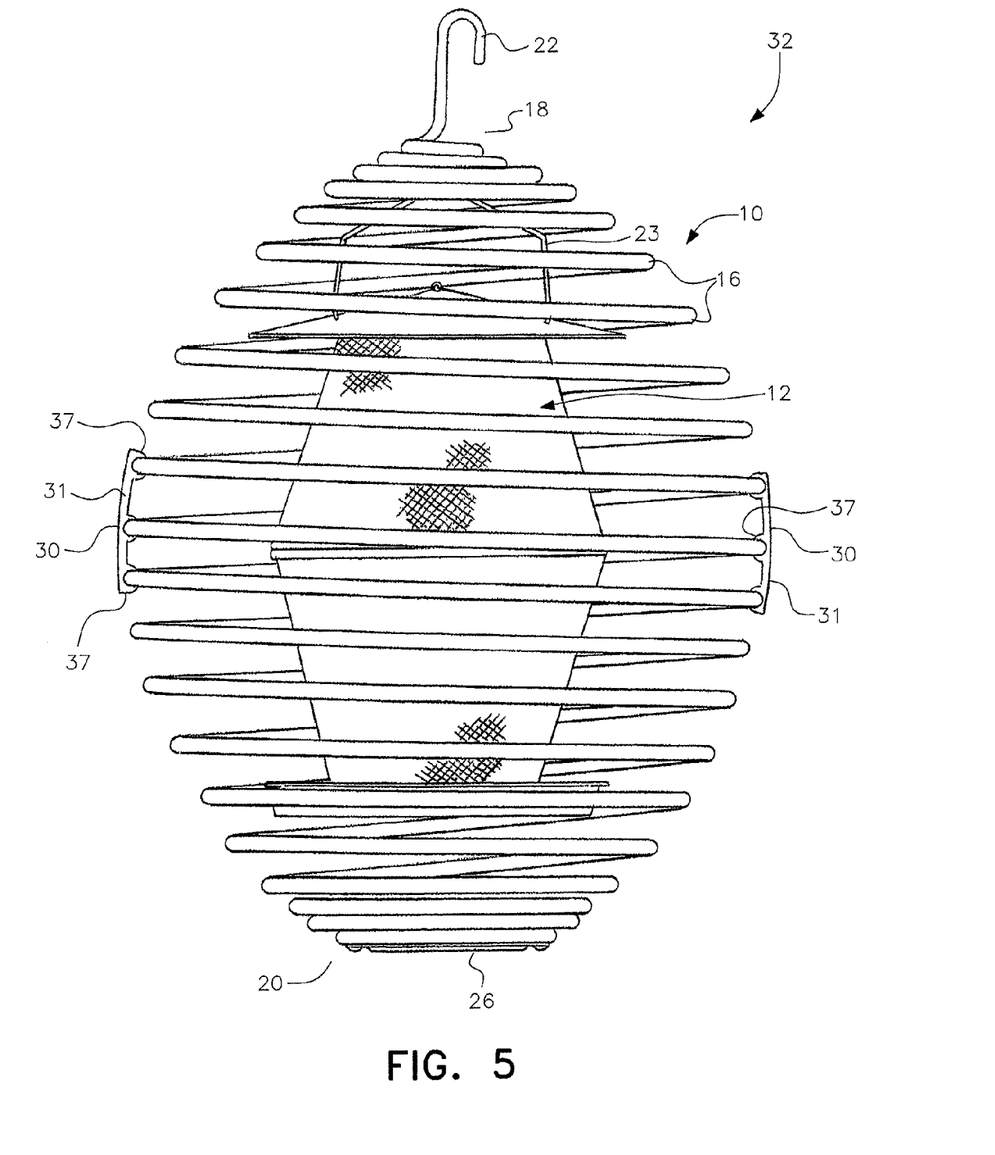
FIG. 5 is a side view of the haven and bird feeder assembly shown in FIG. 4 with both the collapsible bird feeder and haven being in the extended position.

As shown in FIG. 1, the spacing between the convolutions in the middle portion 17 of the haven is larger than the spacing between the convolutions at the upper end 18 and the lower end 20. Above and below the middle portion, represented by the three convolutions secured by the straps as shown in FIGS. 1, 4 and 5, the convolution spacing is maintained at a distance that provides for both bird passage and squirrel exclusion. The spacing becomes progressively smaller toward each of the top and bottom portions of the haven until the convolutions converge and are tangent where they transition to the hook at the top and the closure feature at the bottom. With the spiral rod as shown, this is the natural result obtained when the spiral rod is extended. Uneven spacing of the convolutions is not required however, i.e., the spacing could be consistent from the top of the haven to the bottom of the haven. Consistent spacing may be obtained through appropriate design of the rod and/or the use of connecting elements at the top and bottom of the haven to force the convolutions further apart from one another.

In the pine-cone shaped configuration, the straps are preferably secured at the middle portion 17 as shown. The strap shown in FIG. 1 secures three convolutions in a fixed spacing relationship. However, straps securing more than three convolutions, or only two convolutions, in a fixed spacing relationship are also contemplated and are within the scope of the present invention.

The straps may be made of an injection molded UV-resistant plastic having the flexibility and memory to form essentially a natural "living hinge" at the midpoint of each of the straps. As shown in FIGS. 1, 4 and 5, the straps include an elongated part 31 and a plurality of robust, convolution-shaped clasps 37. Depending upon the number of convolutions to be held in relationship by the strap, the strap could have two, three or more clasps 37. In the embodiment shown, the strap has a clasp 37 at the middle and at each end of the elongated part 31.

Alternatively or additionally, the haven could include open metal "chain links" (not shown) that are closed around consecutive convolutions and maintained in position by snap-on plastic "stops" made of a UV-resistant plastic as described above in connection with the straps. Other elements for maintaining the spacing of adjacent convolutions could also be used as would be understood by persons of ordinary skill in the art and the present invention is not intended to be limited to the particular embodiment shown.

Figure 3:
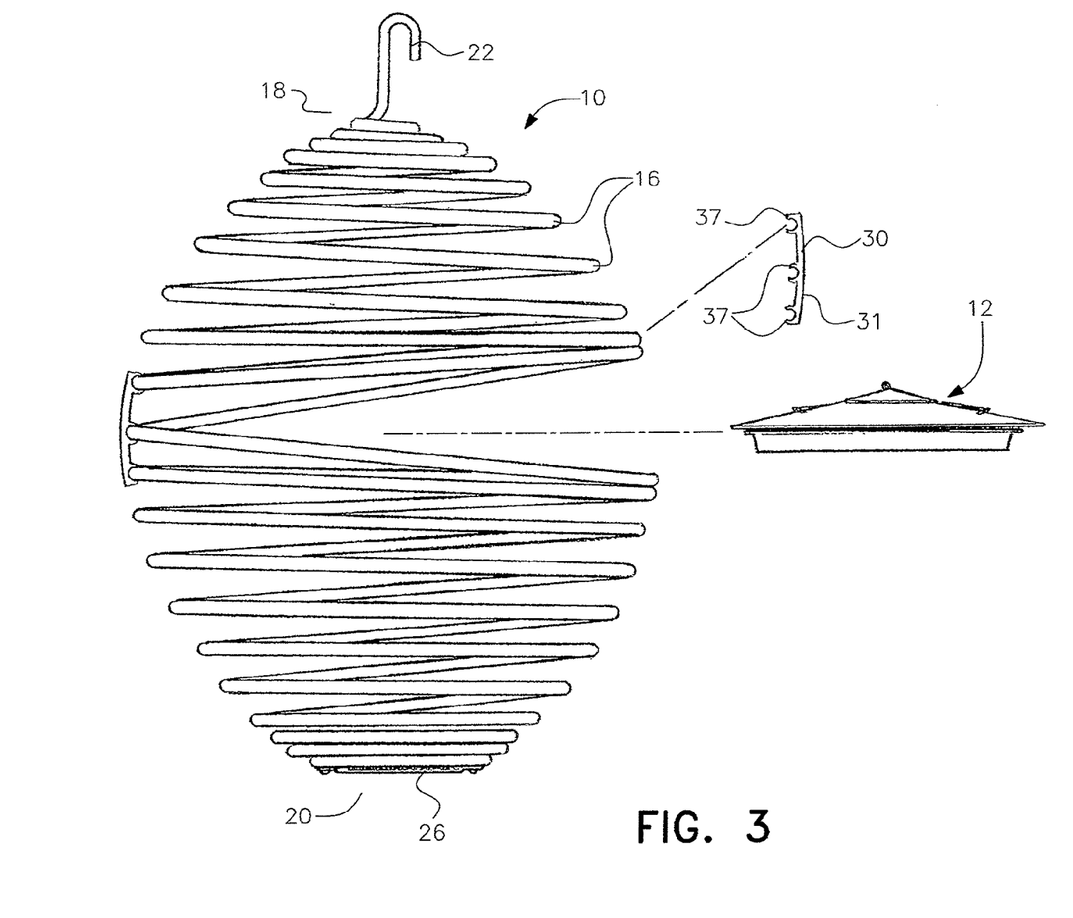
FIG. 3 is a side view illustrating the manner in which the bird feeder shown in FIG. 2, now in a collapsed position, may be inserted through an enlarged side opening and into the haven shown in FIG. 1.

While FIGS. 1 and 3 show only two straps in the central portion of the haven, multiple straps may be used to hold not only the convolutions positioned in the middle portion 17, but also the convolutions between the middle portion 17 and each of the upper and lower ends 18, 20 in a fixed spacing relationship.

In the embodiment shown, the lower end 20 of the haven 10 has an opening 24 which is selectively closable by a cover 26. The opening 24 must be large enough to enable a desired bird feeder to be inserted upwardly into the interior of the haven through the opening 24. Once the bird feeder is inserted, the opening 24 is preferably closed by the cover 26. The cover is not always necessary, however, in which case the convolution spacing at the bottom becomes closer and converges until tangent at the bottom of the haven, effectively preventing squirrel access. In the embodiment shown, the cover 26 is secured to the lower end 20 of the haven by fastening elements 29. The fastening elements may be screws, bolts and the like as would be understood by persons of ordinary skill in the art.

If the bird feeder is also of the collapsible type, the upper end thereof is secured to the upper end of the haven 10 by a feeder handle 23 so that, when the haven 10 is in its extended position, the collapsible bird feeder 12 will also be in its extended position. When a collapsible bird feeder 12 like that shown in FIG. 2 is being used, two of the adjacent convolutions 16 at the central portion 17 of the 10 may be physically separated sufficiently by the user so that the bird feeder 12, in its collapsed position, may be slipped between the space separating adjacent convolutions and into the interior compartment of the haven through the side of the middle portion 17, as shown in FIG. 3.

FIGS. 4 and 5 show the haven 10 and feeder 12 as coupled together to form an assembly, generally designated by reference numeral 32. In the assembly, the feeder 12 is secured to the upper end of the haven 10 by securing the feeder handle 23 (also see handle 33 in FIG. 9) to a snap ring 35 which is suspended from ring 34 welded to the underside of the haven's hook 22 (see FIG. 10). With the feeder 12 thus secured to the upper end of the haven 10, the collapsible bird feeder 12 will be in its extended position when the haven 10 is in its extended position, as shown in FIGS. 4 and 5.

Conversely, when the haven is collapsed, the feeder also assumes its collapsed configuration. The haven and feeder are shown as partially collapsed in FIG. 6. Since the haven's maximum inside diameter is estimated to be on the order of 17 inches, it is intended that the feeder be able to fully collapse when offset from the convolution's center point such that the handle can lie virtually flat, while connected to the haven's inner snap ring (not shown). This may be achieved with a convolution geometry in which the center-most convolution diameters of the haven are approximately twice the feeder's collapsed diameter, permitting the handle to lay flat. The feeder handle may also have a hinged design that enables the handle to be more compact when the feeder is collapsed. Such a hinge could be provided in the form of a hinge-action, or through substitution of chain and a center ring for the one piece bent metal rod shown in FIGS. 4-6. However, it is preferred that the sizing of the haven's array of convolutions allows for full collapse, without the need for a hinged handle.

Figure 8:
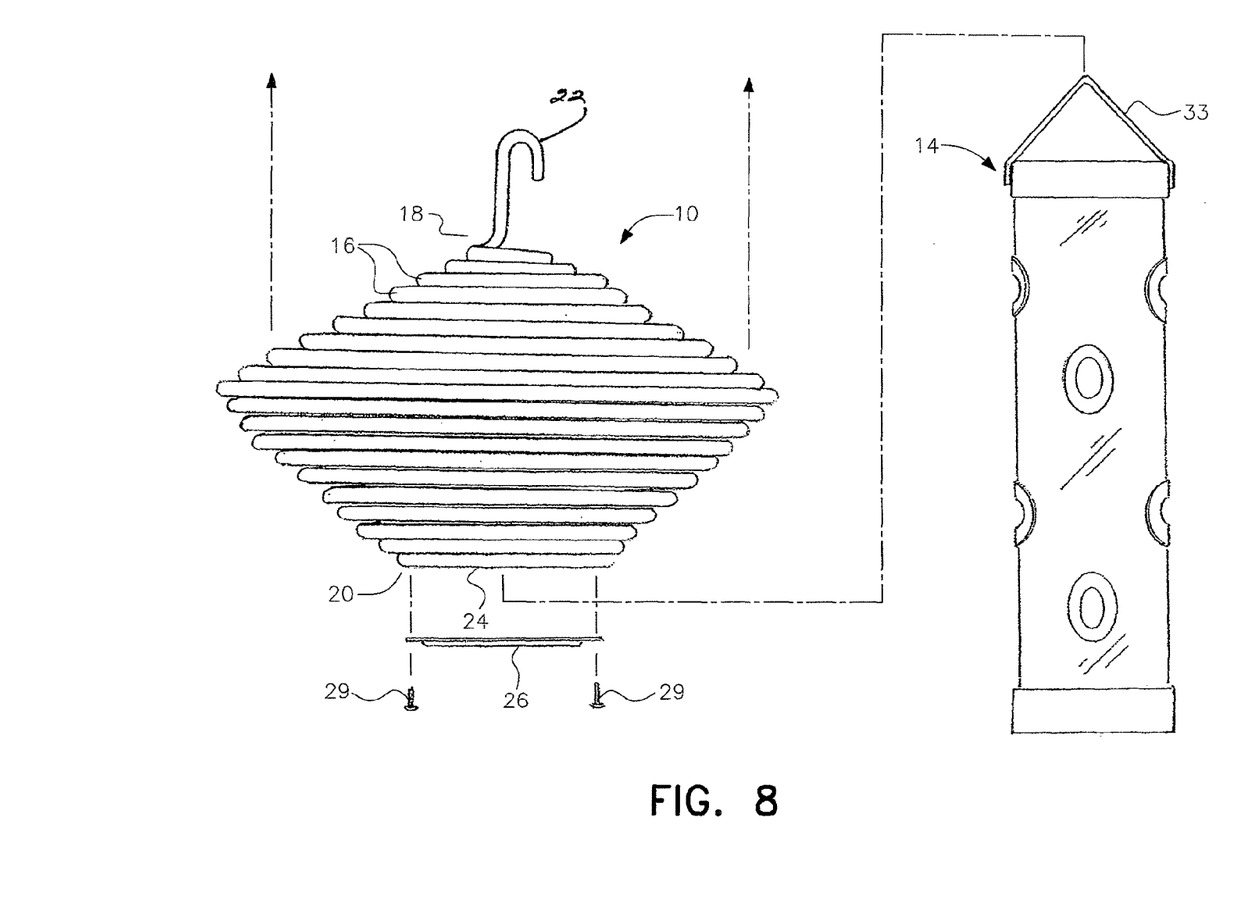
FIG. 8 is a side view of the haven shown in FIG. 7, illustrated in a semi-collapsed position, and the manner in which a tube feeder may be inserted into the haven through the opening in the lower end thereof when the bottom cover has been removed.

As shown in FIGS. 8 and 9, the haven according to the present invention may also be used with a tube-type bird feeder generally designated by reference numeral 14. The tube-type bird feeder may be of the type disclosed in Applicant's U.S. Pat. No. 7,302,911 ("the '911 patent"). The '911 patent is hereby expressly incorporated by reference as if fully set forth herein. Additionally, other types of feeders may be positioned within the haven as would be understood by persons of ordinary skill in the art.

If a tube type feeder 14 is used with the haven 10, the cover 26 at the lower end is removed from the haven 10 as shown in FIGS. 7 and 8. Once the cover is removed, the feeder 14 is inserted upwardly into the interior of the extended haven 10 through the opening 24, as illustrated in FIG. 8. In the embodiment shown, the tube-style feeder's bail type handle 33 is secured to the upper end of the haven snap ring 34, suspended from ring 35 welded to the underside of the haven's hook 22. The cover 26 can then be replaced to enclose the tube-type feeder 14 within the haven as shown in FIG. 9. The overall height of the haven in its extended position and including the hook is between about 22 inches and about 32 inches, more preferably between about 24 inches and about 30 inches, and most preferably about 27 to 28 inches.

Figure 10:
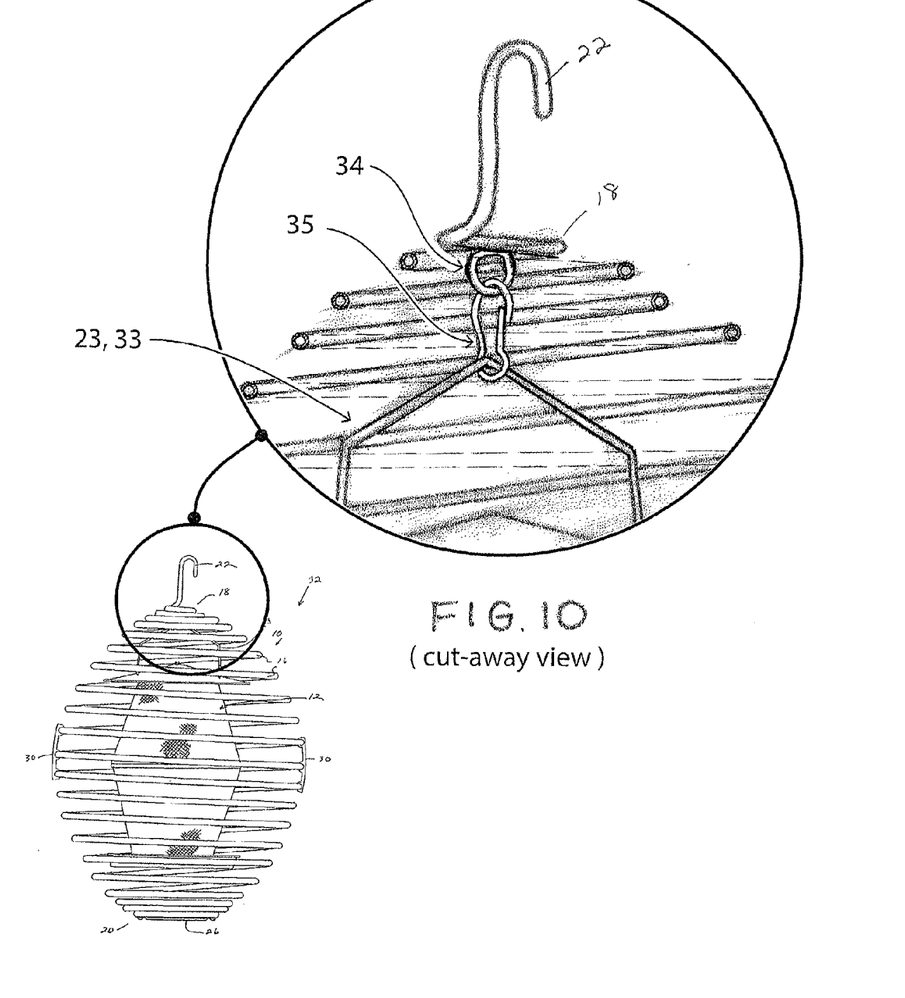
FIG. 10 is an enlarged cut-away view of a top portion of the haven shown in FIGS. 4 and 5, showing the hook for suspending the feeder and the rings for coupling a bird feeder handle to the upper end of the haven.

FIG. 10 provides an enlarged cut-away view of the upper part of the haven shown in FIGS. 4 and 5. The handle 23, 33 is secured to the haven snap ring 35. The snap ring 35 is suspended from ring 34 welded to the underside of the haven's hook 22.

As shown in FIGS. 7 and 8, the cover may be secured with fastening elements 29. Preferably the fasteners are of a type that can be fully engaged without the need for any tools. Alternatively, and more preferably, the cover is configured to be removed and re-secured without the use of loose fastening elements and without tools. Finally, as noted above, however, in some cases closure of the cover may not be necessary as the convolution spacing becomes closer and converges until tangent at the bottom of the haven, effectively preventing squirrel access.

When a tube type feeder 14 is being used, the haven 10 and the feeder 14 may not be simultaneously collapsed. In order for the haven 10 to be collapsed, it is necessary to first open the cover 26 (if previously installed) and remove the feeder 14 from the haven 10.

The haven 10 prevents large birds such as blackbirds or grackles from gaining access to the feeder 12 or the feeder 14. The spacing of the convolutions also prevents squirrels from accessing the interior of the haven. Small birds may gain access to the bird feeder within the haven 10 by moving into the interior of the haven 10 between the convolutions 16.

The haven 10 has few parts and is very economical to manufacture. The haven is also aesthetically pleasing. When the bird feeder has been removed from the haven, the haven may be easily stored or shipped in its collapsed position. Thus it can be seen that the present invention accomplishes at least all of the objectives stated above.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. In combination:
a haven having an upper end and a lower end, the haven including a collapsible spiral rod having a plurality of spiral convolutions, said spiral rod haven being selectively movable between a collapsed position and an extended position, said haven, when in said extended position, defining an interior compartment, and a connecting element for preventing further separation, of adjacent convolutions of the spiral rod haven when the haven is in said extended position; and
a bird feeder positioned within said interior compartment of said spiral rod haven.

2. The combination of claim 1 wherein said bird feeder includes a tube feeder.

3. The combination of claim 1 wherein said bird feeder includes a collapsible bird feeder.

4. The combination of claim 1 wherein said spiral rod haven is made of metal.

5. The combination of claim 1 wherein said lower end of said spiral rod haven has an opening formed therein to enable the bird feeder to be inserted into said interior compartment and removed therefrom through said opening, said opening being selectively closable by a removable door.

6. The combination of claim 1 wherein said upper end of said spiral rod haven has a hook provided thereon to enable said spiral rod haven to be suspended from a support.

7. The combination of claim 1 wherein said spiral rod haven has a middle portion between said upper and lower ends, said middle portion having a greater diameter than a diameter of said upper and lower ends.

8. The combination of claim 7 wherein the convolutions of said spiral rod haven, which extend upwardly from said middle portion, have a progressively reduced diameter and wherein the convolutions of said spiral rod haven, which extend downwardly from said middle portion, have a progressively reduced diameter.

9. The combination of claim 1 wherein the connecting element includes at least one connector which is secured to a plurality of said convolutions.

10. The combination of claim 9 wherein said connector is removably secured to said convolutions.

11. A haven for use with a bird feeder, the haven comprising a collapsible spiral rod having a plurality of spiral convolutions, said spiral rod having an upper end and a lower end and being selectively movable between a collapsed position and an extended position, said haven, when in said extended position, defining an interior compartment in which a bird feeder may be positioned, the haven preventing large birds and squirrels from accessing the interior compartment, and a connecting element for preventing further separation of adjacent convolutions of the spiral rod haven when the haven is in said extended position.

12. The haven as set forth in claim 11 wherein said spiral rod is made of metal.

13. The haven as set forth in claim 11 wherein said lower end of said spiral rod haven has an opening formed therein to enable a bird feeder to be inserted into said interior compartment and removed therefrom through said opening, said opening being selectively closable by a removable door attached to the haven with fastening elements.

14. The haven as set forth in claim 11 wherein said upper end of said spiral rod haven has a hook provided thereon to enable said spiral rod haven to be suspended from a support.

15. The haven as set forth in claim 11 wherein said spiral rod haven has a middle portion between said upper and lower ends, said middle portion having a greater diameter than a diameter of said upper and lower ends.

16. The haven as set forth in claim 15 wherein the convolutions of said spiral rod haven, which extend upwardly from said middle portion, have a progressively reduced diameter and wherein the convolutions of said spiral rod haven, which extend downwardly from said middle portion, have a progressively reduced diameter.

17. The haven as set forth in claim 11 wherein the connecting element includes at least one connector which is secured to a plurality of said convolutions.

18. The haven as set forth in claim 17 wherein said connector is removably secured to said convolutions.

19. A haven for use with a bird feeder, the haven comprising a collapsible spiral rod having a plurality of spiral convolutions, said spiral rod having an upper end, a lower end and a middle portion between said upper and lower ends, said spiral rod being selectively movable between a collapsed position and an extended position, said haven, when in said extended position, defining an interior compartment in which a bird feeder may be positioned, the haven preventing large birds and squirrels from accessing the interior compartment, the convolutions of said spiral rod haven, which extend upwardly from said middle portion, having a progressively reduced diameter and the convolutions of said spiral rod haven, which extend downwardly from said middle portion, having a progressively reduced diameter, the progressively reduced diameters of said convolutions of said upper end and said lower end being substantially mirror images of one another, and said lower end of said spiral rod haven having an opening formed therein to enable a bird feeder to be inserted into said interior compartment and removed therefrom through said opening, said opening being selectively closable by a removable door attached to the lower end of the haven with fastening elements.

\* \* \* \* \*